Sept. 15, 1959 G. SALMET 2,904,685

FREQUENCY-DOUBLING CIRCUIT ARRANGEMENT

Filed June 18, 1957 2 Sheets-Sheet 1

INVENTOR
GASTON SALMET
BY
Frank R. Jifri
AGENT

Sept. 15, 1959 G. SALMET 2,904,685

FREQUENCY-DOUBLING CIRCUIT ARRANGEMENT

Filed June 18, 1957 2 Sheets-Sheet 2

INVENTOR
GASTON SALMET
BY Frank R. Trifari
AGENT

United States Patent Office 2,904,685

Patented Sept. 15, 1959

2,904,685

FREQUENCY-DOUBLING CIRCUIT ARRANGEMENT

Gaston Salmet, Courbevoie, France, assignor to North American Philips Company, Inc., New York, N.Y., a corporation of Delaware Application June 18, 1957, Serial No. 666,404

Claims priority, application France July 3, 1956

4 Claims. (Cl. 250—27)

This invention relates to frequency-doubling circuit arrangements in which by means of an electric control motor the tuning frequency of the output circuit can be automatically tuned to a frequency which is twice that of a signal supplied to the input, for example for use in multi-channel generators.

According to the invention, in a circuit arrangement of the kind described in the preamble, the frequency-doubled signal which is set up at the output circuit of the frequency-doubling circuit arrangement is added, through a 90° phase-shifting network, to the input signal and the resulting sum signal is supplied to a peak-detection circuit arrangement comprising two rectifiers, which detect the positive and negative peak voltages respectively of the sum signal, the output voltages from the rectifiers being compared in an amplitude comparison device to produce a voltage controlling the control motor.

The use of the step in accordance with the invention ensures inter alia that with continuous variation of the frequency of the input signal the tuning frequency of the output circuit will invariably be tuned to twice the frequency of the input signal, whilst in addition ageing, temperature variations and the like substantially do not affect the accuracy of the output circuit tuning.

Figure 1:
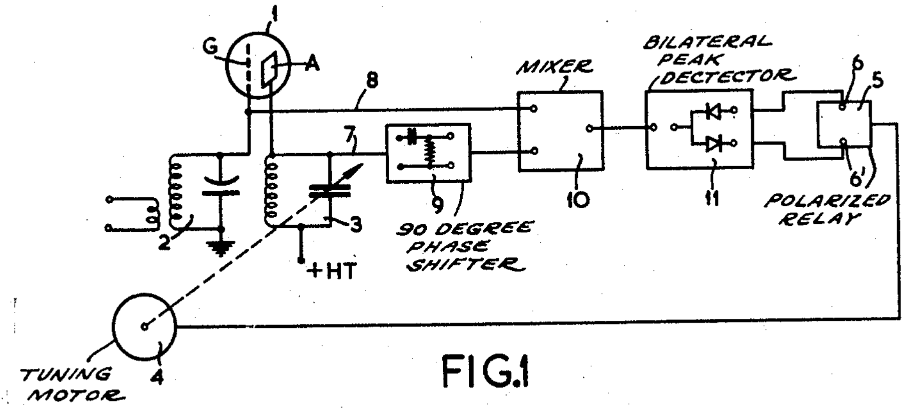
Figure 2A:
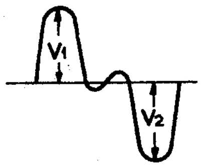
Figure 2B:
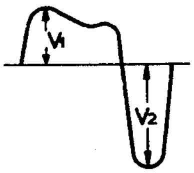
Figure 2C:
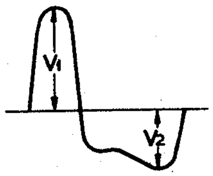
Figure 3:
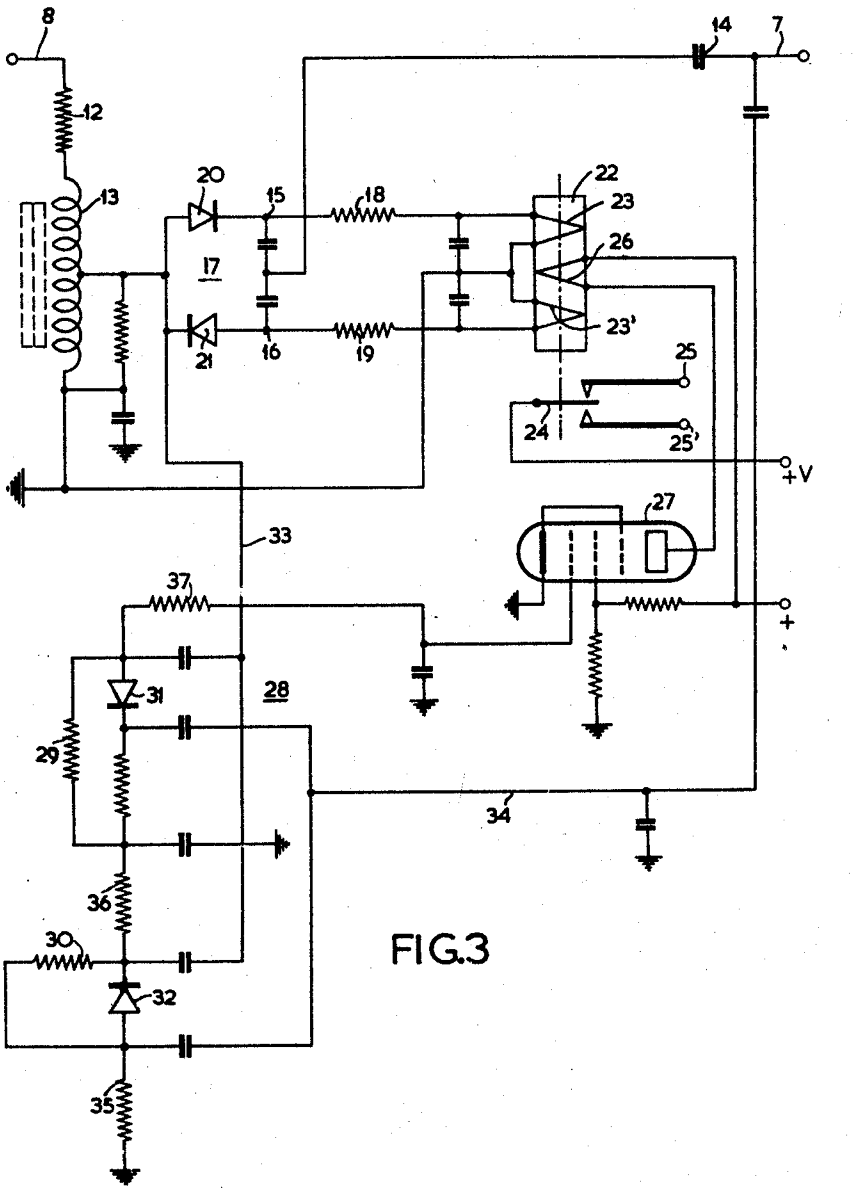

In order that the invention may readily be carried out, two embodiments thereof will now be described by way of example, with reference to the accompanying diagrammatic drawings, in which:

Fig. 1 shows, in block-schematic form, a frequency-doubling circuit arrangement in accordance with the invention, Figures 2*a*, 2*b* and 2*c* are characteristics illustrating the operation of the doubling circuit arrangement shown, while Fig. 3 is a diagram of a preferred embodiment of the circuit arrangement in accordance with the invention shown in greater detail.

In Fig. 1, reference numeral 1 denotes an electron valve, which is connected as a frequency-doubler for operation in class B and C and is provided with an input circuit 2 connected to its control grid and an output circuit 3 connected to the anode. The tuning of the output circuit 3 can be controlled by means of a tuning motor 4, which is controlled by the output voltage of an amplitude-comparison device 5 of a type known per se (for example a polarized relay) and stops when the voltages supplied to its input terminals 6, 6' are equal. These voltages are derived from voltages which are taken, through leads 7 and 8, from the input circuit 2 and the output circuit 3 respectively, the frequency-doubled signal set up at the output circuit 3 being added, through a 90° phase-shifting network 9, to the input signal in a mixer stage 10, the sum voltage taken from this mixer stage 10 being subsequently converted, with the aid of a bilateral peak detector 11, into the voltages supplied to the terminals 6 and 6' respectively of the device 5.

With a view to a better understanding of the operation of the automatic tuning circuit arrangement in accordance with the invention shown in Fig. 1, it should be recalled that in an electron valve operated in class B or C, the anode of which is provided with a truly ohmic resistance, the anode current I*a* varies as a function of the grid voltage $V_g$ symmetrically with respect to a vertical axis which corresponds to the instant at which the grid voltage $V_g$ has a maximum (or minimum) value. If, consequently, the grid alternating voltage is equal to:

$$V_g \cos \omega t$$

all harmonics of the anode current are cosine terms. If, now, by the use of suitable means (for example mixer stage 10 in Fig. 1), a part of the grid voltage and a part of the anode voltage, which latter part is shifted through a phase angle $\pi/2$, are added, on tuning the output circuit to the second harmonic (the anode voltage having a phase difference $\pi$ from the second harmonic of the anode current) a total voltage is produced which is equal to:

$$V_t = K_1 V_g \cos \omega t - K_2 V_p \cos (2\omega t - \pi/2)$$
$$= K_1 V_g \cos \omega t - K_2 V_p \sin 2\omega t$$

If in this equation a new quantity $\tau$ is substituted for the expression $t$ where:

$$t = \frac{\pi}{2} - \tau$$

we have:

$$V_t = K_1 V_g \cos \left(\frac{\pi}{2} - \omega t\right) - K_2 V_p \sin (\pi - 2\omega\tau)$$
$$= K_1 V_g \sin \omega\tau - K_2 V_p \sin 2\omega\tau$$

From this it follows that the function obtained, which contains only sine terms, is symmetrical with respect to the point $\tau=0$, at which the absolute peak values $V_1$ and $V_2$ of the positive and negative voltage halves are equal (see Fig. 2*a*). If, however, the output circuit is not accurately tuned to the second harmonic of the input oscillation, there is a difference between the peak values of the positive and negative halves of the alternating voltage, the polarity of this difference depending upon the direction of the deviation from the desired tuning. With a deviation in one direction, the sum voltage has the variation shown in Fig. 2*b* and with a deviation in the other direction, the variation shown in Fig. 2*c*.

A comparison of the direct voltages produced by detection of the peak voltages $V_1$ and $V_2$ in an amplitude-comparison device 5 as shown in Fig. 1 permits of controlling the tuning motor 4 by means of the control voltage obtained in order to provide automatic tuning of the output circuit 3 to the second harmonic of the oscillation supplied to the input.

Fig. 3 shows a preferred embodiment, in which, similarly to the embodiment shown in Fig. 1, the leads 7 and 8 are connected to the control grid and the anode respectively of a frequency-doubling valve (not shown) operated in class B or class C. The lead 8 includes a series-resistor 12 and a coil 13 provided with a centre tapping, the lead 7 containing a capacitor 14 which, together with two resistors 18 and 19 connected to output terminals 15 and 16 of a bilateral peak detector arrangement 17, forms a 90° phase-shifting network. The detection arrangement 17 comprises two asymmetrically connected rectifier cells 20 and 21, which are connected, through the centre tap on the coil 13, to the lead 8 and, through a capacitive coupling, to the lead 7. The detector arrangement 17 ensures that the voltages which are derived from the control grid and the anode respectively and are supplied through leads 7 and 8, are added and detected, so that there are set up at the output terminals 15 and 16 the direct voltages which correspond to the positive and negative peaks $V_1$ and $V_2$ respectively, the values and signs of which depend upon the instantaneous phase relation between the input voltage supplied to the control grid of the frequency-doubling valve and the second harmonic of this voltage, which harmonic is taken from the anode.

A polarized motor control relay 22 is connected to the output terminals 15 and 16 of the peak detection circuit 17. This relay is provided with two main windings 23 and 23' which are fed with the detected peak voltages. According to the sign of the amplitude difference of these voltages, the contact 24 of the relay can assume two positions in addition to the rest position, in one of which the motor (not shown), which is connected to terminals 25 and 25', rotates in a sense such that the tuning of the output circuit of the frequency-doubling valve is changed in a direction reducing the said voltage difference, whilst in the other position of the contact 24 the motor rotates in the opposite sense. If the main windings 23 and 23' are energized substantially equally, the contact 24 is in the rest position shown, in which the control motor rotates in neither sense.

The circuit arrangement hitherto described corresponds to a detailed embodiment of the circuit arrangement shown in Fig. 1, which can be used without further expedients if the range through which the tuning frequency of the output circuit is variable, is small. If, however, the tuning range of the output circuit must be large and, for example, includes the frequency of the input oscillation or an odd harmonic thereof, the peak voltages $V_1$ and $V_2$ show no difference if the output circuit is tuned to the frequency of the input signal (or an odd harmonic). Therefore, in the preferred embodiment shown in Fig. 3, additional steps have been taken to ensure that the motor control described hereinbefore becomes operative only if the tuning of the output circuit is near to the desired tuning, that is to say, means are provided which, starting from the lowest tuning frequency of the output circuit, take over control of the motor until the tuning approaches the second harmonic. This secures tuning to the second harmonic and not to the fundamental or an odd harmonic thereof.

Accordingly, the relay 22 is provided with an auxiliary winding 26, through which passes the anode current of an electron valve 27 to the control grid of which a control voltage is supplied, which is taken from a peak detection arrangement 28 comprising two rectifiers 31 and 32 which are shunted by resistors 29 and 30 respectively and are fed, through leads 33 and 34 respectively, with voltages derived from the control grid and the anode respectively of the frequency-doubling valve.

The voltage taken from the anode of the frequency-doubling valve is added (without 90° phase-shift) to the voltage taken from the control grid, and the peak voltages $V_1$ and $V_2$ of the sum voltage are detected by means of the peak detection arrangement 28 by applying these voltages to opposite electrodes of the rectifiers 31 and 32 thereof. The voltages produced by peak detection are set up across the resistors 29 and 30 and consequently appear in series and with opposite polarity in the control-grid circuit of the valve 27, which control-grid circuit also includes series-resistors 35, 36 and 37. The circuit 26—37 operates so that, starting from the lowest tuning frequency of the tuning range, the anode current of the valve 27 provides a strong excitation of the auxiliary winding 26 of the motor-control relay 22, so that the control motor connected to the terminals 25 and 25' rotates and remains rotating, even when the output circuit tuning passes a tuning frequency which corresponds to the frequency of the input oscillation, whereas, when the tuning approaches the second harmonic of the input oscillation, the valve 27 is cut off by a strong negative voltage applied to its control grid, so that the anode current passing through the auxiliary winding 26 disappears and the circuit described hereinbefore and including the peak detection circuit 17, takes over control. In close proximity to the desired tuning to the second harmonic, the sum voltage supplied to the peak detector circuit arrangement 28 is shaped in the form shown in Fig. 2*b* and, owing to the choice of the direction of detection, the sum total of the detected voltage has a high negative value, so that the valve 27 is cut off. However, if the tuning departs from the desired tuning frequency, the anode voltage assumes a shape as shown in Fig. 2*a*, the total detected voltage is reduced and the valve 27 again passes current. It will be appreciated that, if the tuning of the output circuit of the frequency-doubling valve corresponds to the second harmonic of the input oscillation, the total detected voltage is zero.

In order to prevent the valve 27 from being cut off, owing to an accidental inequality of the rectifiers 31 and 32 used in the peak detection arrangement 28 or of the alternating voltages supplied thereto, before the tuning approaches the desired tuning, the rectifier 32 is proportioned so that, if the alternating voltages supplied to the rectifiers 31 and 32 are equal, the direct voltage derived from rectifier 32 exceeds the direct voltage supplied by rectifier 31.

What is claimed is:

1. A frequency doubling circuit comprising a source of an alternating input signal, means including a tuned output circuit for producing an output signal which is double the frequency of said input signal, a control device connected to vary the tuning of said output circuit, signal adding means connected to add said input and output signals 90 degrees out of phase to produce a sum signal, a peak detector circuit connected to detect the positive and negative peaks of said sum signal, an amplitude comparison device connected to said peak detector circuit to produce a control voltage in accordance with the output signals of said peak detector circuit, and means connected to apply said control voltage to said control device.

2. A frequency doubling circuit comprising a source of an alternating input signal, means including a tuned output circuit for producing an output signal which is double the frequency of said input signal, a control device connected to vary the tuning of said output circuit, a peak detector adding circuit comprising a pair of rectifiers having unlike electrodes connected to a junction, means connected to apply said input signal to said junction, two capacitors connected in series between the remaining electrodes of said rectifiers, means including a third capacitor connected to apply said output signal to the junction of said capacitors, a polarized control relay connected to control said control device and having an input circuit, and two resistors connected respectively between said input circuit and said remaining electrodes of the pair of rectifiers, said two resistors and said third capacitor being dimensioned to form a 90 degree phase shifting network for said output signal.

3. A circuit as claimed in claim 2, in which said control relay comprises an auxiliary winding, and including an amplifier tube having a control grid and an anode, said auxiliary winding being connected to said anode, and an auxiliary peak detector circuit having an output circuit connected to said control grid and comprising a pair of rectifiers having unlike electrodes connected to receive said input signal and having their remaining electrodes connected to receive said output signal.

4. A circuit for producing a control voltage from two alternating signals, the first of said signals having a frequency substantially double that of the second of said signals, said circuit comprising signal adding means connected to add said two signals 90 degrees out of phase to produce a sum signal, a peak detector circuit connected to detect the positive and negative peaks of said sum signal, and an amplitude comparison device connected to said peak detector circuit to produce said control voltage in accordance with the output signals of said peak detector circuit.

References Cited in the file of this patent

UNITED STATES PATENTS

| | | |
|---|---|---|
| 2,065,565 | Crosby | Dec. 29, 1936 |
| 2,653,243 | McClellan | Sept. 22, 1953 |